Oct. 2, 1923.
T. J. FLOREY
1,469,503
CLOSET SEAT BUMPER
Filed Jan. 11, 1923
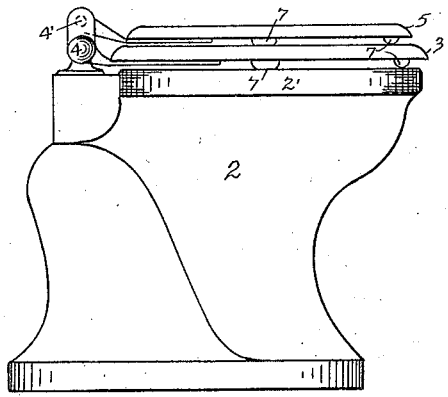
*Fig.1*
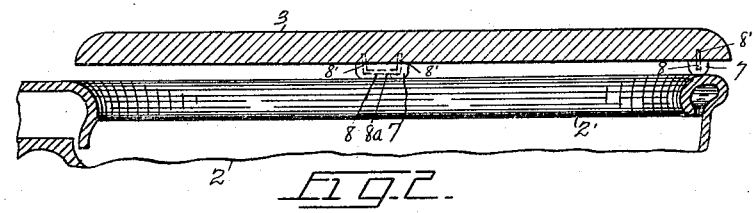
*Fig.2*
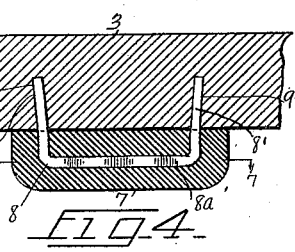 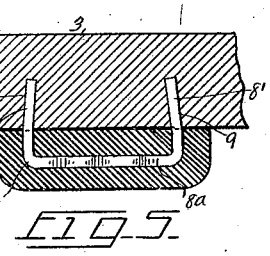
*Fig.3*   *Fig.4*   *Fig.5*
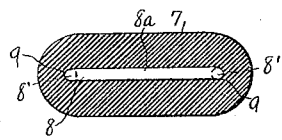 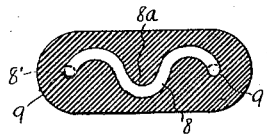 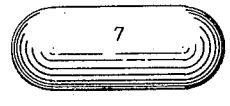
*Fig.6*   *Fig.7*   *Fig.8*
Inventor
Tilghman J. Florey.
By Harry D. Wallace.
Attorney Patented Oct. 2, 1923.

1,469,503

UNITED STATES PATENT OFFICE.

TILGHMAN J. FLOREY, OF WASHINGTON, NEW JERSEY, ASSIGNOR TO B. O. T. MFG. CO., OF TRENTON, NEW JERSEY, A CORPORATION OF NEW JERSEY.

CLOSET-SEAT BUMPER.

Application filed January 11, 1923. Serial No. 612,115.

*To all whom it may concern:*

Be it known that I, TILGHMAN J. FLOREY, a citizen of the United States, residing at Washington, in the county of Warren and State of New Jersey, have invented certain new and useful Improvements in Closet-Seat Bumpers, of which the following is a specification.

This invention relates to cushion bumpers, designed for use in connection with water-closet seats and covers, for preventing breaking, chafing or otherwise injuring the fragile earthenware bowls, by the falling or slamming of the seats.

The object of the invention is to provide a bumper for closet seats and the like, comprising a relatively soft rubber body of suitable size to afford adequate cushioning, and which is detachably secured to the undersides of the closet seat, as well as the cover. A further object is to provide novel and simple means for securing the bumper to the seat and cover, the said means preferably consisting of a single piece of metal, which is imbedded in the rubber body when molded. And a further object is to provide novel and simple means for effecting the clinching of parts of the fasteners for preventing accidental detachment of the bumpers from the seats and covers.

I attain these objects by the means set forth in the detailed description which follows, and as illustrated by the accompanying drawing, in which—

Figure 1 is a side elevation of a water-closet bowl, seat and cover, to which my improvement is applied. Fig. 2 is an enlarged broken sectional view of the bowl and seat. Figs. 3, 4 and 5 are similar fragmentary sections of a closet seat; showing various methods of fastening my bumpers to the seat. Fig. 6 is a horizontal section, taken on line 6—6 of Fig. 3; showing a plain staple-like fastener. Fig. 7 is a similar section, taken on line 7—7 of Fig. 4; showing means for reinforcing the fastener, as well as the bumper. And Fig. 8 is a bottom face view of the rubber body.

In the drawing, 2 represents an ordinary earthenware water-closet bowl, having a hollow flushing-rim 2', which surrounds the usual open top of the bowl. 3 represents an ordinary closet seat, which substantially covers the open top of the bowl, and may be hinged to any kind of post 4. 5 represents a cover, which may be hinged at 4'. In practice, the seat 3 is usually spaced from the rim 2' of the bowl, by means of a series of bumpers, as 7, and in like manner the cover is spaced from the seat. As a rule these bumpers are made out of relatively soft rubber, which not only produces the desired cushion effect, but the material of the bumpers is of such nature that contact between the bumpers and the more or less fragile rim 2' is not liable to chafe or otherwise injure or mar the bowl. The bumpers 7, in the present case, are preferably molded, and during this molding operation, fasteners 8 are partially imbedded in the body of the bumpers, in such manner that the two parts are inseparable. In the preferred disposition and arrangement of the fastener 8, none of the metal, excepting two tangs or arms 8' employed for securing the bumper to the work, is exposed. Each fastener 8 preferably comprises a single strand of round wire of suitable gauge, which is previously bent substantially U-shaped, for providing the spaced tangs 8'. The body $8^a$ of the fastener is preferably disposed horizontally about midway of the depth of the bumper 7, so that a relatively thick layer of the rubber is disposed both above and below the portion $8^a$. The body $8^a$ of the fastener may be plain and straight, as shown in Figs. 3 and 6; but in the preferred construction, the said body is given a serpentine formation, as best seen in Figs. 4 and 7. By this latter construction and arrangement, the metal portion $8^a$ is not liable to come into contact with the rim 2' until the bumper is so nearly worn out as to require replacing, and by providing this serpentine formation of the body portion $8^a$, the whole fastener is not only adequately reinforced, but it is also more effectually balanced, than the fastener shown in Figs. 3 and 6. This is very desirable, because it tends to prevent the bumper from flexing or wobbling laterally and becoming canted or working loose.

In preparing the seat and cover for the reception of the bumpers, relatively small holes 9 are bored in the bottom surfaces of the parts, and in order to insure the proper application of the bumpers, the holes 9 are preferably of slightly smaller caliber than the tangs 8' of the fasteners, so as to require more or less force to drive the tangs home. For the straightout tangs, as shown in Figs.

3 and 6, the holes may be bored perpendicular to the bottom faces of the seat and cover. But in the preferred method of applying the bumpers, the holes 9 are bored at angles to the bottom faces of the seat and cover, as best seen in Figs. 4 and 5. By the latter arrangement of the sockets 9, the tangs 8', when driven into the holes are bent towards or from each other, thereby producing a clinching effect, which renders accidental detachment or loosening of the bumpers impossible. The gauge of the wire from which the fasteners 8 are made is preferably the same throughout, and the free ends of the tangs 8' are preferably blunt, instead of being tapered, since it has been found that tapering tangs are more liable to work loose, and besides they are more expensive to make.

My improved bumpers together with their fasteners, are extremely simple, durable and inexpensive, and may be readily and quickly applied and removed without any special tools, and without danger of splitting or injuring the seats and covers.

Having thus described my invention, what I claim, is—

1. A bumper for closet seats comprising a molded rubber body having a substantially level face for contacting with the seat, and a U-shaped metal fastener having its body portion imbedded midway in the depth of the rubber body, the arms of the fastener comprising plain tangs which project from the level face adapted to be driven in and clinched to the seat.

2. The combination with a closet seat having sockets in its bottom surface arranged in pairs and at angles to the plane of said bottom, of a rubber bumper having a substantially flat face for contact with the bottom of the seat, and a U-shaped wire fastener having a serpentine body for reinforcing the fastener and the rubber body imbedded in the rubber and having perpendicular tangs extending beyond the rubber and adapted to be driven into a pair of said angular sockets for clinching the bumper to the seat.

3. A rubber bumper for water closet seats, comprising an elongated body having a substantially level face for contacting with the face of the seat, and a U-shaped fastener having round blunt tangs adapted to be driven into angular holes in the seat, the body portion of said fastener being imbedded substantially in the line of the longitudinal axis of the rubber body, and the said body portion having a serpentine formation for preventing lateral flexing and wobbling of the bumper.

4. The combination of a closet seat having sockets in its bottom side arranged in pairs and at angles to each other and to the plane of said bottom side, a rubber bumper having a substantially flat face for contact with said bottom side and overspreading said sockets, and a wire fastener having a serpentine body imbedded substantially in the line of the longitudinal axis of the rubber bumper, and having perpendicular integral tangs extending beyond said flat face and adapted when driven into said sockets to be bent to conform to the angularity of the sockets for clinching and holding the bumper from wobbling.

In testimony whereof I affix my signature.

TILGHMAN J. FLOREY.